US012738148B2

(12) United States Patent
Ahangama Ralalage et al.

(10) Patent No.: US 12,738,148 B2
(45) Date of Patent: Sep. 15, 2026

(54) FAST ACTIVATION OF A GROUP OF REMOTE NOTIFICATION DEVICES

(71) Applicant: Tyco Fire & Security GmbH, Neuhausen am Rheinfall (CH)

(72) Inventors: Nalin C. Ahangama Ralalage, Brossard Quebec (CA); Sebastien Choquette, Beloeil (CA)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 205 days.

(21) Appl. No.: 18/347,427

(22) Filed: Jul. 5, 2023

(65) Prior Publication Data

US 2025/0014452 A1 Jan. 9, 2025

(51) Int. Cl.
*G08B 25/00* (2006.01)
*G08B 27/00* (2006.01)
*G08B 17/00* (2006.01)

(52) U.S. Cl.
CPC ......... *G08B 25/008* (2013.01); *G08B 27/005* (2013.01); *G08B 17/00* (2013.01)

(58) Field of Classification Search
CPC ..... G08B 25/008; G08B 27/005; G08B 17/00
USPC .......................................................... 340/577
See application file for complete search history.

(56) References Cited

U.S. PATENT DOCUMENTS 5,210,523 A * 5/1993 Tipping ................. G08C 25/00 340/533
5,903,854 A * 5/1999 Abe ...................... H03F 1/0277 455/73
5,949,974 A * 9/1999 Ewing ................... G06F 1/3209 713/340
6,426,697 B1 * 7/2002 Capowski ................ G08B 3/10 340/3.52
6,690,274 B1 * 2/2004 Bristol ............... G05B 23/0267 340/521
7,170,396 B2 * 1/2007 Kalafarski ............... G08B 3/10 340/288
9,397,898 B2 * 7/2016 Huliyar ................... G06F 3/048
9,589,626 B1 * 3/2017 Liu ...................... G11C 7/1084
10,970,994 B2 * 4/2021 Norton ................. G08B 29/126
11,043,111 B1 * 6/2021 Escofet Via ........... G08B 29/16
2002/0131864 A1 * 9/2002 Vos ....................... B60W 10/06 416/25
2007/0008099 A1 * 1/2007 Kimmel ................. G08B 25/14 340/506
2007/0035407 A1 * 2/2007 Capowski .............. G08B 17/00 340/679
2009/0279500 A1 * 11/2009 Luo ....................... H04W 72/23 370/330

(Continued)

*Primary Examiner* — Brian A Zimmerman
*Assistant Examiner* — Thang D Tran
(74) *Attorney, Agent, or Firm* — ArentFox Schiff LLP

(57) ABSTRACT

A fire alarm control panel (FACP), method, and computer program product for interfacing a FACP with remote notification devices. The aspects include receiving, by the FACP, a single input command configured to contemporaneously control a power condition of multiple groups of the remote notification devices by specifically identifying each of the multiple groups of the remote notification devices. The aspects further include contemporaneously controlling, by the FACP, the power condition of the multiple groups of the remote notification devices responsive to an execution of the single input command.

29 Claims, 4 Drawing Sheets

(56) References Cited

U.S. PATENT DOCUMENTS

| | | | | |
|---|---|---|---|---|
| 2009/0309740 | A1* | 12/2009 | Savage, Jr. | G08B 5/36 340/815.4 |
| 2010/0019575 | A1* | 1/2010 | Verges | H02J 3/14 307/38 |
| 2011/0150188 | A1* | 6/2011 | Buss | G08B 29/123 379/27.01 |
| 2012/0032815 | A1* | 2/2012 | Savage, Jr. | H05B 47/10 340/815.4 |
| 2013/0134780 | A1* | 5/2013 | Parsonnet | H02J 3/14 307/25 |
| 2014/0223153 | A1* | 8/2014 | Hsieh | G06F 1/3206 713/1 |
| 2015/0253292 | A1* | 9/2015 | Larkin | G01N 29/30 73/571 |
| 2016/0247385 | A1* | 8/2016 | Stafford | G08B 29/02 |
| 2017/0076585 | A1* | 3/2017 | El-Mankabady | G08B 27/006 |
| 2017/0171071 | A1* | 6/2017 | Turon | H04W 4/80 |
| 2018/0200552 | A1* | 7/2018 | Wertsberger | A62C 37/40 |
| 2018/0204429 | A1* | 7/2018 | Savage, Jr. | G08B 5/38 |
| 2018/0374338 | A1* | 12/2018 | Bonfiglio | H04B 7/26 |
| 2019/0154029 | A1* | 5/2019 | Jochman | F04B 49/225 |
| 2020/0066125 | A1* | 2/2020 | Boguslawski | G08B 17/10 |
| 2020/0312123 | A1* | 10/2020 | Carrieri | G08B 25/14 |
| 2020/0402381 | A1* | 12/2020 | Nelson | G08B 7/06 |
| 2021/0065535 | A1* | 3/2021 | De Blonde | G08B 29/145 |
| 2021/0160843 | A1* | 5/2021 | Yang | H04L 1/0091 |
| 2021/0166539 | A1* | 6/2021 | Rodriguez | G08B 17/06 |
| 2021/0183217 | A1* | 6/2021 | Tran | G08B 7/062 |
| 2021/0241595 | A1* | 8/2021 | Young | A62C 37/36 |
| 2022/0039221 | A1* | 2/2022 | Woytowitz | H05B 45/37 |
| 2022/0101700 | A1* | 3/2022 | Deshpande | G08B 7/06 |
| 2023/0098609 | A1* | 3/2023 | Patel | G08B 17/117 340/632 |
| 2023/0125575 | A1* | 4/2023 | Oja | G08B 3/10 715/728 |
| 2023/0298346 | A1* | 9/2023 | Alshammary | G08B 29/043 382/103 |

* cited by examiner

FAST ACTIVATION OF A GROUP OF REMOTE NOTIFICATION DEVICES

FIELD

The present disclosure relates generally to fire alarm control systems. More particularly, the present disclosure relates to fast activation of a group of remote notification devices by a fire alarm panel in a fire alarm system.

BACKGROUND

Fire alarm panels are currently designed to support multiple Individual Device Notification Appliance Circuit (IDNAC) device Virtual NACs (VNACs) (also referred to herein as "groups of remote notification devices"). However, the current protocol only allows activating one group at a time. If more than one group is required to be activated at the same time, individual VNAC activation commands for each group must be sent spaced apart by an amount that is based on which mode (e.g., standby, alarm) the command is issued in.

For example, commands to activate or deactivate multiple groups must be spaced 50 ms apart in standby mode, and 250 ms apart in alarm mode, which are the fastest respective messaging speeds allowed in the current protocol for standby and alarm modes.

Thus, for example, for 20 groups of remote notification devices in standby mode, 20 separate messages, each message spaced 50 ms apart and directed to controlling only 1 group will contribute to collectively consuming 1 second in messaging time. Moreover, the 20 groups are only controlled (to be powered up or down) after the last command for the last group is received. Thus, in standby mode, it can take at least 1 second before all groups begin to get activated or deactivated.

In another example, for 20 groups of remote notification devices in alarm mode, 20 separate messages, each message spaced 250 ms apart and directed to controlling only 1 group will contribute to collectively consuming 5 seconds in messaging time. Moreover; in alarm mode the line is already activated thus each time a message is received the respective remote group of devices will be activated. However; the messages are spaced 250 ms and therefore it takes 5 seconds until the last group of remote devices is activated or deactivated.

According to the Underwriters Laboratory of Canada (ULC), there is a timing requirement where remote notification devices should be activated within 5 seconds after initiating an alarm. As is evident, the current protocol will fail this requirement if more than a certain number of groups need to be turned on contemporaneously. Hence, there is a need for a more efficient approach to activating multiple VNACs.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to aspects of the present disclosure, a fire alarm control panel configured to interface with remote notification devices is provided. The fire alarm control panel includes one or more memories, individually or in combination, having instructions. The fire alarm control panel further includes one or more processors each coupled to at least one of the one or more memories and configurable to execute the instructions to receive a single input command configured to contemporaneously control a power condition of multiple groups of the remote notification devices by specifically identifying each of the multiple groups of the remote notification devices. The one or more processors are further configurable to execute the instructions to contemporaneously control the power condition of the multiple groups of the remote notification devices responsive to an execution of the single input command.

According to other aspects of the present disclosure, a method for interfacing a fire alarm control panel (FACP) with remote notification devices is provided. The method includes receiving, by the FACP, a single input command configured to contemporaneously control a power condition of multiple groups of the remote notification devices by specifically identifying each of the multiple groups of the remote notification devices. The method further includes contemporaneously controlling, by the FACP, the power condition of the multiple groups of the remote notification devices responsive to an execution of the single input command.

According to still other aspects of the present disclosure, a computer program product configured to interface a fire alarm control panel (FACP) with remote notification devices is provided. The computer program product includes one or more non-transitory computer-readable media, having instructions stored thereon that when executed by one or more processors cause the one or more processors, individually or in combination, to perform a method. The method includes receiving, by the FACP, a single input command configured to contemporaneously control a power condition of multiple groups of the remote notification devices by specifically identifying each of the multiple groups of the remote notification devices. The method further includes contemporaneously controlling, by the FACP, the power condition of the multiple groups of the remote notification devices responsive to an execution of the single input command.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Figure 1:
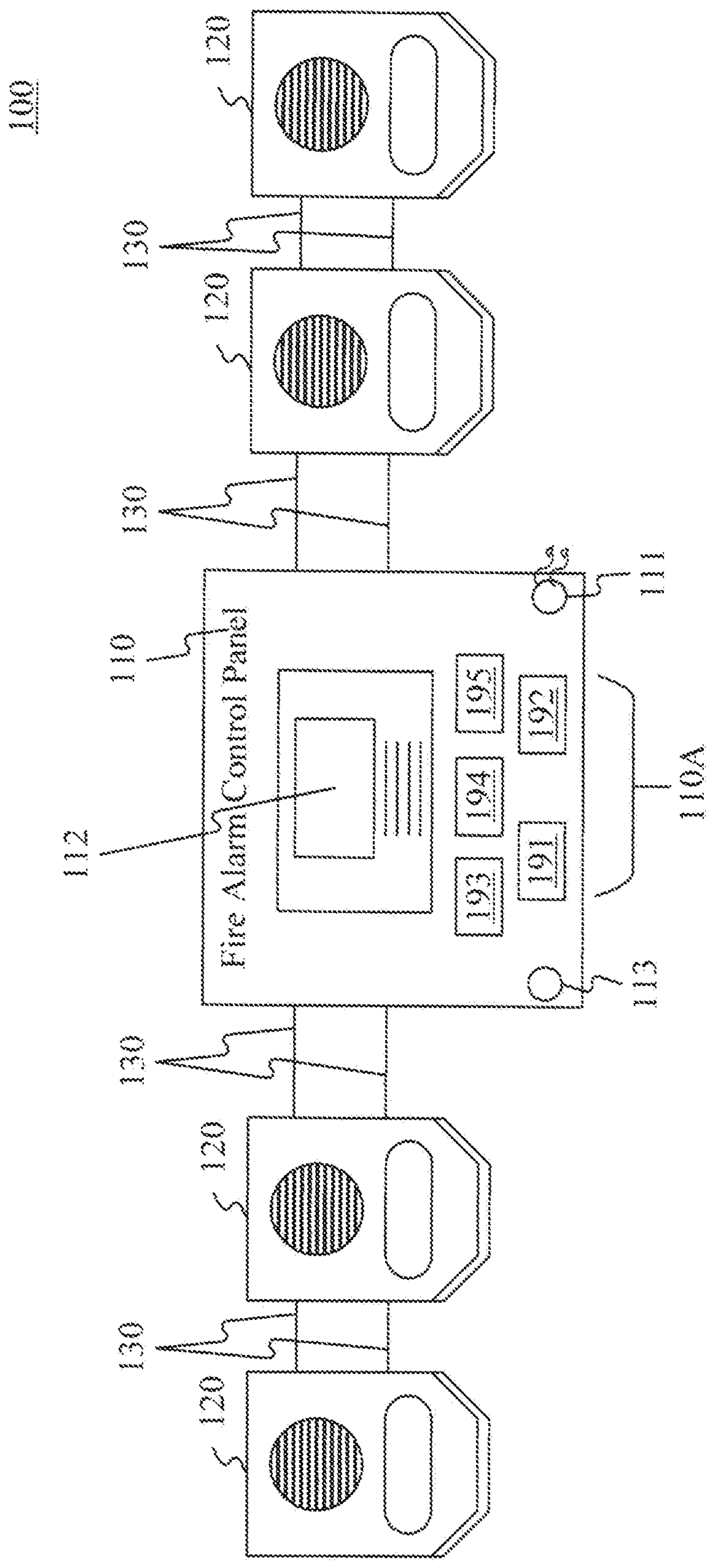
FIG. 1 is a block diagram of an example of a fire notification system, in accordance with an example aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Various aspects of the present disclosure provide a method, apparatus, and computer program product for fast activation of multiple Individual Device Notification Appliance Circuit (IDNAC) device Virtual NACs (VNACs) (also referred to herein as "groups of remote notification devices") at the same time.

As noted above, the current fire alarm control panel protocol allows for activating only one group of remote notification devices at a time using a respective command directed to that specific group and spaced 50 ms or 250 ms apart depending on whether the current mode is standby mode or alarm mode, respectively.

In various aspects, instead of sending one message every 50 ms or 250 ms per group of remote notification devices as respectively required of the current protocol (or any time spacing as required of any other protocol) in standby and alarm modes, aspects of the present disclosure update the current protocol (in standby, alarm and any other mode) to be responsive to a single control command, such as but not limited to a bitmap or other formatted message, specifying multiple groups of remote notification devices that are to be activated or deactivated contemporaneously, including at the same time or substantially simultaneously with some overlap. For example, instead of maintaining a spacing on the issuance of control commands as per the current protocol, the commands may be issued one after another with as little overlap as possible. In an aspect, contemporaneously means one after another without an intentionally induced delay specifically directed to maintaining a predetermined spacing between the commands as per a protocol. Some buffering may be performed, but in all cases, the issuance of the commands will be faster than currently possible due to the lifting of the protocol's intentional spacing constraint, e.g., of 50 ms or 250 ms depending on the mode.

In various aspects, a command having one or more bytes is used to identify which groups of remote notification devices are to be powered up or down. In various aspects, a single bit is used in a string of bits (one or more bytes) to represent a respective group from among a plurality of groups. In this way, the groups that are to be powered up or powered down at the same time can be identified and contemporaneously controlled, instead of consecutively controlled with a predetermined command spacing as per the current protocol.

Various aspects of the present disclosure are especially beneficial in meeting tight timing requirements such as the 5 second Underwriters Laboratory of Canada (ULC) timing requirement where remote notification devices should be activated within 5 seconds after initiating an alarm. As noted above with respect to the example of more than 20 groups of remote notification devices in alarm mode, activating or deactivating, will consume at least 5 seconds in just command transmission time.

In various aspects, a command having a bitmap is used to specify which groups of remote notification devices are to be powered up or down from a set of groups of remote notification devices. The bitmap provides an efficient way to represent and identify multiple groups within a larger set of groups up to all groups to be powered up or down in a single command.

Referring now to FIG. 1, a fire notification system 100, also referred to as a fire alarm system, is shown, in accordance with an example aspect. Fire notification system 100 is a system for providing notification in the case of a fire. In accordance with various aspects of the disclosure, fire notification system 100 includes remote notification devices 120, which can be any devices capable of detecting a fire or other emergency condition and/or relaying audible, visible, or other stimuli to alert building occupants of the fire or other emergency condition. For example, a remote notification device 120 can include, but is not limited to, any one or any combination of the following: a smoke detector; a heat detector; a speaker; a microphone; a buzzer; a fire alarm switch (e.g., a pull switch); a light (e.g., LED); a relay; and so forth.

Fire notification system 100 can be any system that includes a fire alarm control panel 110 (hereinafter "fire alarm control panel") and a plurality of remote notification devices 120 interconnected by fire notification system wiring 130.

The fire alarm control panel 110 includes one or more memories 191, individually or in combination, having instructions for fast activation of multiple IDNAC device VNACs. The instructions can be, for example, based on method 300 of FIGS. 3-4. The fire alarm control panel 110 further includes one or more processors 192, each coupled to at least one of the one or more memories 191 and configurable to execute the instructions. The one or more memories 191 and the one or more processors 192 implement a multi-VNAC contemporaneous controller 110A as described in further detail herein.

In an aspect, fire alarm control panel 110 further includes a connection port 193 configured to connect to a user device such as a laptop, a tablet, a smart phone, and so forth, an input device 194 configured to receive user inputs, a transceiver 195 for communicating with remote notification devices (control station transceivers, smart phones, and so forth), and a display 112 configured to display information relating to the configuring and operating of the remote notification devices 120 and the fire alarm control panel 110. In an aspect, fire alarm control panel 110 may include a speaker 113 for emitting an alarm or other information and/or a light source (LED) 111 for indicating a mode or a status of the fire alarm control panel 110 and/or the remote notification devices 120.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

In various aspects, the multi-VNAC contemporaneous controller 110A is configured to make it easy for a technician and/or installer and/or the fire notification system 100 itself to control multiple groups of VNACs at the same time using a single command. In this way, efficient and timely control of multiple groups of VNACs can be contemporaneously performed. For example, a technician and/or installer make enable or disable multiple groups at a time for configuration and/or testing and/or other purposes. As a further example, the fire notification system 100 itself may respond to situations such as a fire alarm pull by activating multiple groups of VNACs at the same time.

In various aspects, the multi-VNAC contemporaneous controller 110 is configured to run a protocol that receives and processes user inputs forming single commands that specify two or more groups of VNACS for contemporaneous control (powering up or down). Various aspects of the present disclosure are not limited to any specific protocol or standard.

Remote notification devices 120 may be powered by an Alternating Current (AC) or Direct Current (DC) power source (e.g., a battery). Remote notification devices 120 can include a light notification module and a sound notification module. The light notification module can be implemented as a light emitting device or any component in remote notification devices 120 that alerts occupants of an emergency by emitting a visible light signal. In some aspects, remote notification devices 120 emit strobe flashes to alert building occupants of an emergency situation. A sound notification module can be a speaker or any component in the remote notification devices 120 that alerts occupants of an emergency by emitting an audible signal. In some aspects, which should not be construed as limiting, remote notification devices 120 may emit one or more audible signals.

Figure 2:
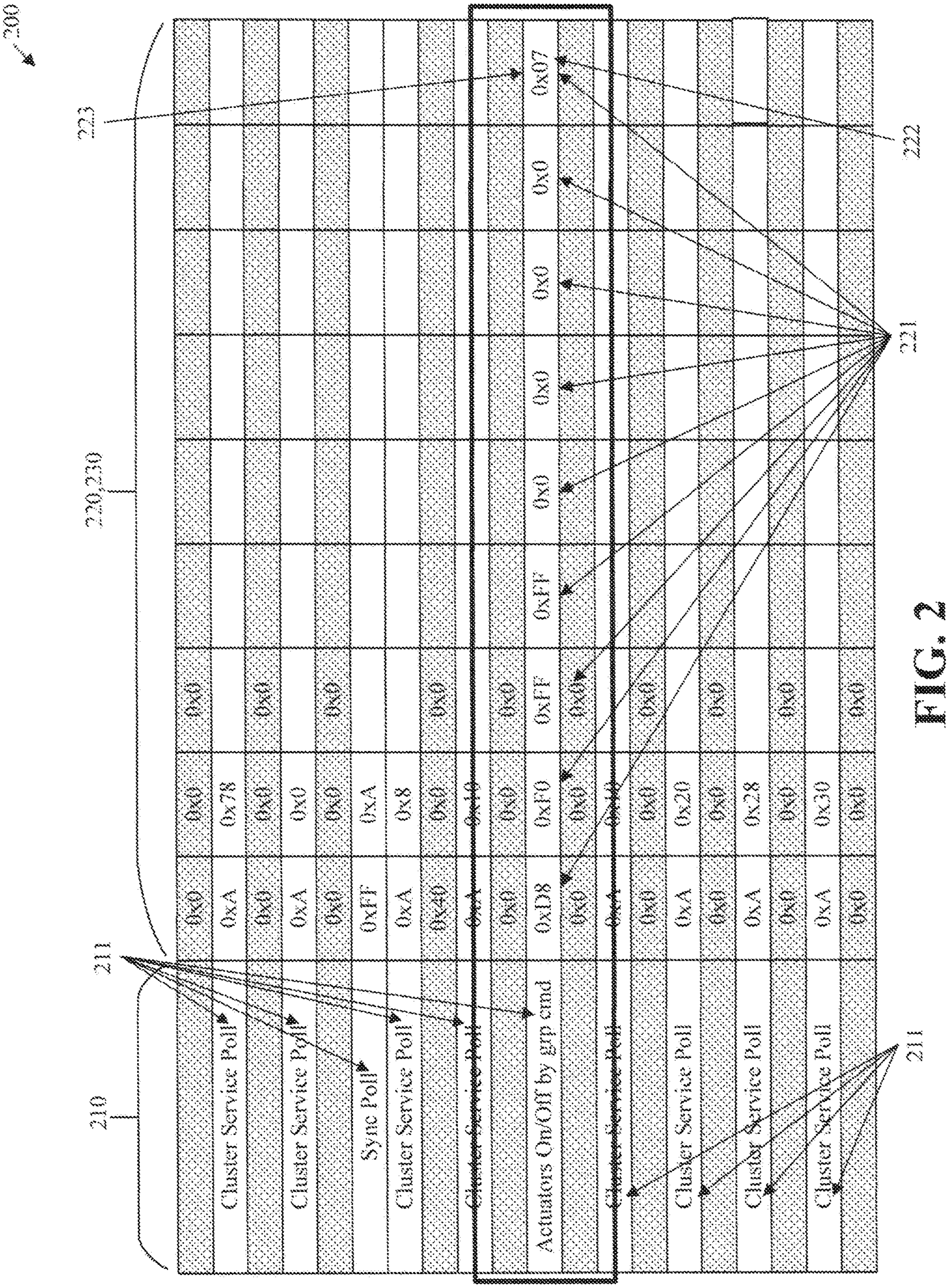
FIG. 2 is a block diagram of a listing of example commands capable of being input to the fire alarm control panel of FIG. 1, in accordance with an example aspect.

Referring now to FIG. 2, a listing 200 of example commands capable of being input to fire alarm control panel FACP (110) of FIG. 1 are shown, in accordance with an example aspect.

A command section 210 specifies commands 211 and a value section 220 specifies values for the commands 211 (e.g., in the form of bitmaps 23-). In an aspect, the commands 211 may be executed by the multi-VNAC contemporaneous controller 110A.

In an aspect, each column in the command section 210 specifies a respective command 211, and each column in the value section 220 specifies a respective byte 221 of a bitmap 230 arranged horizontally. That is, each horizontal line after a command 211 represents a respective bitmap 230 of values for that command 211 that includes multiple bytes 221. Other arrangements are possible.

The FACP 110, e.g., the multi-VNAC contemporaneous controller 110A of the FACP 110, may receive a single input command configured to contemporaneously control a power condition of multiple groups of the remote notification devices 120 by specifically identifying each of the multiple groups of the remote notification devices 120 using a bitmap 230.

In the aspect, an "actuators On/Off by grp cmd" type command is used.

While various arrangements (mappings) of the bitmap are described above and below for the sake of illustration, other arrangements (mappings) of the bitmap 230 may also be used given the teachings of the present disclosure provided herein. To be clear, one or more remote notification devices may be mapped to a value indicating whether the one or more remote notification devices are present (specified) in a command and thus due for contemporaneous control as described herein.

In an aspect, respective ones of the multiple devices 120 are specified using a respective one of a plurality of bits of the bitmap 230.

In an aspect, as shown in FIG. 2, respective ones of the multiple devices 120 are specified using a respective one of a plurality of bits in multiple bytes 221 forming a bitmap 230. In an aspect, each byte corresponds to a different one of the multiple groups of the remote notification devices 120, and each bit of each byte corresponds to a different one of the remote notification devices 120 in a group. In an aspect, the first nibble 222 of the last byte 223 of the bitmap 230 sets the coding pattern of multiple groups of the remote notification devices 120.

In an aspect, respective ones of the multiple groups of remote notification devices 120 are specified using a respective one of a plurality of bits of the bitmap 230.

In an aspect, respective ones of the multiple groups of remote notification devices 120 are specified using a respective one of a plurality of bits of the bitmap 230.

In an aspect, a first value and a second value for a given position in the bitmap 230 are used to selectively indicate a presence or an absence, respectively, of a particular remote notification device or a particular group of the remote notification devices in the multiple groups of the remote notification devices 120.

Groups may be formed by location, function, type, serial number, status, and so forth. The preceding listing is merely illustrative and not exhaustive.

Figure 3:
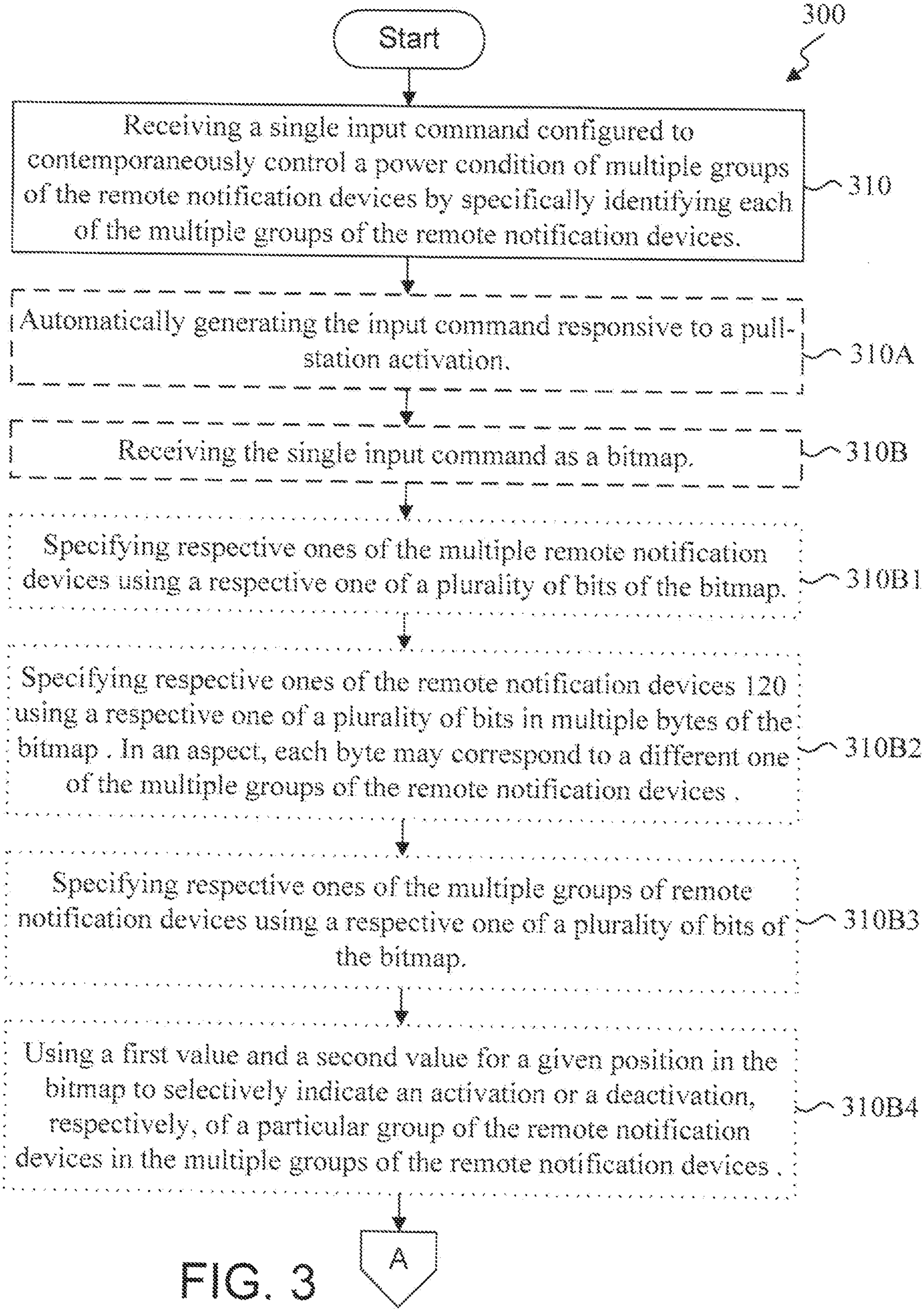
FIGS. 3-4 are flow diagrams of a method for equation interpretation based device simulation, in accordance with an example aspect.
Figure 4:
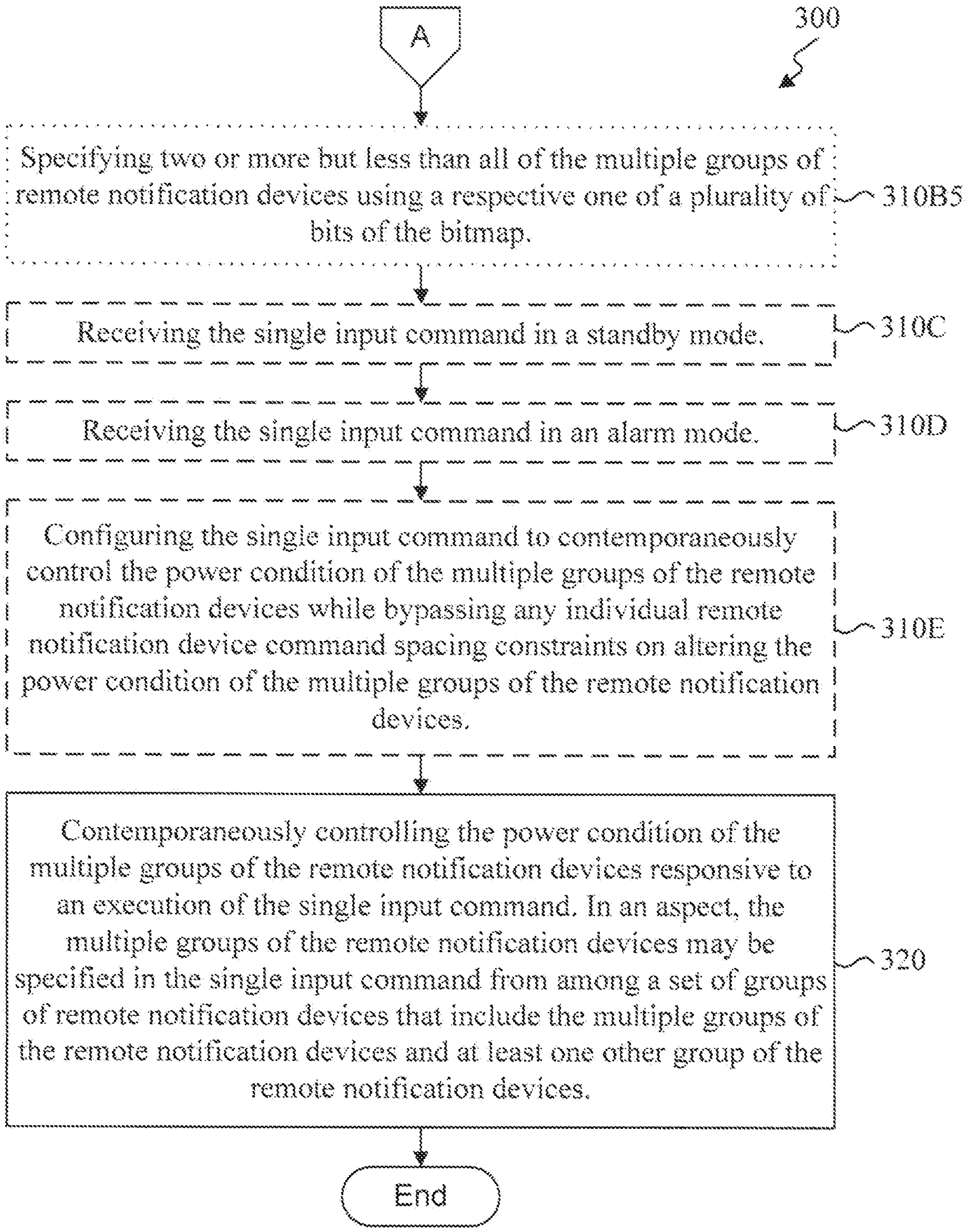

Referring now to FIGS. 3-4, an example method 300 for interfacing a fire alarm control panel (FACP) with remote notification devices is shown, in accordance with an example aspect. The method 300 may be performed by the FACP 110 based on instructions stored in one or more memories 191, individually or in combination, and executable by one or more processors 192, individually or in combination.

At block 310, the method 300 includes receiving a single input command configured to contemporaneously control a power condition of multiple groups of the remote notification devices 120 by specifically identifying each of the multiple groups of the remote notification devices 120.

In an aspect, block 310 can include one or more of blocks 310A through 310E.

At block 310A, the method 300 includes automatically generating the input command responsive to a pull-station activation.

At block 310B, the method 300 includes receiving the single input command as a bitmap 230.

In an aspect, the method 300 can include one or more of blocks 310B1 through 310B5.

At block 310B1, the method 300 includes specifying respective ones of the multiple remote notification devices 120 using a respective one of a plurality of bits of the bitmap 230.

At block 310B2, the method 300 includes specifying respective ones of the remote notification devices 120 using a respective one of a plurality of bits in multiple bytes of the bitmap 230. In an aspect, each byte may correspond to a different one of the multiple groups of the remote notification devices 120.

At block 310B3, the method 300 includes specifying respective ones of the multiple groups of remote notification devices 120 using a respective one of a plurality of bits of the bitmap 230.

At block 310B4, the method 300 includes using a first value and a second value for a given position in the bitmap 230 to selectively indicate an activation or a deactivation, respectively, of a particular group of the remote notification devices in the multiple groups of the remote notification devices 120.

At block 310B5, the method 300 includes specifying two or more but less than all of the multiple groups of remote notification devices 120 using a respective one of a plurality of bits of the bitmap 230.

At block 310C, the method includes receiving the single input command in a standby mode.

At block 310D, the method 300 includes receiving the single input command in an alarm mode.

At block 310E, the method 300 includes configuring the single input command to contemporaneously control the power condition of the multiple groups of the remote notification devices 120 while bypassing any individual remote notification device command spacing constraints on altering the power condition of the multiple groups of the remote notification devices 120.

At block 320, the method 300 includes contemporaneously controlling the power condition of the multiple groups of the remote notification devices 120 responsive to an execution of the single input command. In an aspect, the multiple groups of the remote notification devices 120 may be specified in the single input command from among a set of groups of remote notification devices (not shown) that include the multiple groups of the remote notification devices 120 and at least one other group of the remote notification devices (not shown).

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages.

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one aspect" or "an aspect" of the present disclosure, as well as other variations thereof, means that a particular feature, structure, characteristic, and so forth described in connection with the aspect is included in at least one aspect of the present disclosure. Thus, the appearances of the phrase "in one aspect" or "in an aspect," as well any other variations, appearing in various places throughout the specification are not necessarily all referring to the same aspect.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

It should be understood that the application is not limited to the details or methodology set forth in the following description or illustrated in the figures. It should also be understood that the phraseology and terminology employed herein is for the purpose of description only and should not be regarded as limiting.

While the exemplary aspects illustrated in the figures and described herein are presently preferred, it should be understood that these aspects are offered by way of example only. Accordingly, the present application is not limited to a particular aspect, but extends to various modifications that nevertheless fall within the scope of the appended claims. The order or sequence of any processes or method steps may be varied or re-sequenced according to alternative aspects.

What is claimed is:

1. A fire alarm control panel configured to interface with remote notification devices, comprising:

one or more memories, individually or in combination, having instructions;

one or more processors each coupled to at least one of the one or more memories and configurable to execute the instructions to:

receive a single input command comprising a bitmap that identifies the power condition of multiple groups of the remote notification devices by specifically identifying each of the multiple groups of the remote notification devices within the bitmap, wherein each bit of the bitmap corresponds to a respective one of the multiple groups of the remote notification devices; and contemporaneously control the power condition of the multiple groups of the remote notification devices responsive to an execution of the single input command while bypassing a per-group command spacing constraint of a protocol governing communication with the remote notification devices.

2. The fire alarm control panel in accordance with claim 1, wherein the multiple groups of the remote notification devices are specified in the single input command from among a set of groups of remote notification devices that include the multiple groups of the remote notification devices and at least one other group of the remote notification devices.

3. The fire alarm control panel in accordance with claim 1, wherein the input command is automatically generated responsive to a pull-station activation.

4. The fire alarm control panel in accordance with claim 1, wherein the single input command comprises a bitmap.

5. The fire alarm control panel in accordance with claim 4, wherein each respective one of a plurality of bits of the bitmap specifies a respective one of the remote notification devices.

6. The fire alarm control panel in accordance with claim 4, wherein each respective one of a plurality of bits in multiple bytes of the bitmap specifies a respective one of the remote notification devices, and wherein each of the multiple bytes corresponds to a respective one of the multiple groups of the remote notification devices.

7. The fire alarm control panel in accordance with claim 4, wherein each respective one of a plurality of bits of the bitmap specifies a respective one of the multiple groups of the remote notification devices.

8. The fire alarm control panel in accordance with claim 4, wherein a first value and a second value for a given position in the bitmap selectively indicate an activation or a deactivation, respectively, of a particular group of the remote notification devices in the multiple groups of the remote notification devices.

9. The fire alarm control panel in accordance with claim 4, wherein each respective one of a plurality of bits of the bitmap specifies at least two but less than all of the multiple groups of the remote notification devices.

10. The fire alarm control panel in accordance with claim 1, wherein the single input command, configured to contemporaneously control the power condition of the multiple groups of remote notification devices, is received and executed in a standby mode.

11. The fire alarm control panel in accordance with claim 1, wherein the single input command, configured to contemporaneously control the power condition of the multiple groups of remote notification devices, is received and executed in an alarm mode.

12. The fire alarm control panel in accordance with claim 1, wherein the single input command is configured to contemporaneously control the power condition of the multiple groups of the remote notification devices while bypassing any individual remote notification device command spacing constraints on altering the power condition of the multiple groups of the remote notification devices.

13. The fire alarm control panel in accordance with claim 1, wherein the single input command is configured to simultaneously control the power condition of the multiple groups of remote notification devices.

14. A method for interfacing a fire alarm control panel (FACP) with remote notification devices, comprising:

receiving, by the FACP, a single input command comprising a bitmap that identifies the power condition of multiple groups of the remote notification devices by specifically identifying each of the multiple groups of the remote notification devices within the bitmap, wherein each bit of the bitmap corresponds to a respective one of the multiple groups of the remote notification devices; and contemporaneously controlling, by the FACP, the power condition of the multiple groups of the remote notification devices responsive to an execution of the single input command while bypassing a per-group command spacing constraint of a protocol governing communication with the remote notification devices.

15. The method in accordance with claim 14, wherein the multiple groups of the remote notification devices are specified in the single input command from among a set of groups of remote notification devices that include the multiple groups of the remote notification devices and at least one other group of the remote notification devices.

16. The method in accordance with claim 14, wherein the input command is automatically generated responsive to a pull-station activation.

17. The method in accordance with claim 14, wherein the single input command comprises a bitmap.

18. The method in accordance with claim 17, wherein each respective one of a plurality of bits in multiple bytes of the bitmap specifies a respective one of the remote notification devices, and wherein each of the multiple bytes corresponds to a respective one of the multiple groups of the remote notification devices.

19. The method in accordance with claim 17, wherein each respective one of a plurality of bits of the bitmap specifies a respective one of the remote notification devices.

20. The method in accordance with claim 17, wherein each respective one of a plurality of bits of the bitmap specifies a respective one of the multiple groups of the remote notification devices.

21. The method in accordance with claim 17, wherein a first value and a second value for a given position in the bitmap selectively indicate an activation or a deactivation, respectively, of a particular group of the remote notification devices in the multiple groups of the remote notification devices.

22. The method in accordance with claim 17, wherein each respective one of a plurality of bits of the bitmap specifies at least two but less than all of the multiple groups of the remote notification devices.

23. The method in accordance with claim 14 wherein the single input command, configured to contemporaneously control the power condition of the multiple groups of remote notification devices, is received and executed in a standby mode.

24. The method in accordance with claim 14, wherein the single input command, configured to contemporaneously control the power condition of the multiple groups of remote notification devices, is received and executed in an alarm mode.

25. The method in accordance with claim 14, wherein the single input command is configured to contemporaneously control the power condition of the multiple groups of the remote notification devices while bypassing any individual remote notification device command spacing constraints on altering the power condition of the multiple groups of the remote notification devices.

26. The method in accordance with claim 14, wherein the method is performed by one or more memories, individually or in combination, having instructions, and one or more processors each coupled to at least one of the one or more memories and configurable to execute the instructions to perform the method.

27. The method in accordance with claim 14, wherein the single input command is configured to simultaneously control the power condition of the multiple groups of remote notification devices.

28. A computer program product configured to interface a fire alarm control panel (FACP) with remote notification devices, the computer program product comprising one or more non-transitory computer-readable media, having instructions stored thereon that when executed by one or more processors cause the one or more processors, individually or in combination, to perform a method comprising:

receiving, by the FACP, a single input command comprising a bitmap that identifies the power condition of multiple groups of the remote notification devices by specifically identifying each of the multiple groups of the remote notification devices within the bitmap, wherein each bit of the bitmap corresponds to a respective one of the multiple groups of the remote notification devices; and contemporaneously controlling, by the FACP, the power condition of the multiple groups of the remote notification devices responsive to an execution of the single input command while bypassing a per-group command spacing constraint of a protocol governing communication with the remote notification devices.

29. The fire alarm control panel in accordance with claim 1, wherein the single input command is configured to contemporaneously control the power condition of the multiple groups of the remote notification devices while bypassing at least one spacing constraint on altering the power condition per-group.

* * * * *